United States Patent

Nance

[11] Patent Number: 5,215,413
[45] Date of Patent: Jun. 1, 1993

[54] COMPOSITE-TO-METAL SHAFT JOINT

[75] Inventor: Donald A. Nance, Los Altos, Calif.

[73] Assignee: Westinghouse Electric Corp., Pittsburgh, Pa.

[21] Appl. No.: 736,358

[22] Filed: Jul. 26, 1991

[51] Int. Cl.$^5$ .............................................. B25G 3/00
[52] U.S. Cl. ................................. 403/259; 403/334; 403/404
[58] Field of Search ............... 403/259, 334, 404, 250, 403/260; 416/244 B; 464/181

[56] References Cited

U.S. PATENT DOCUMENTS

| 3,584,473 | 6/1971 | Francois | 464/181 X |
| 4,358,284 | 11/1982 | Federmann et al. | 464/181 |
| 4,895,351 | 1/1990 | Devaud | 464/181 X |

FOREIGN PATENT DOCUMENTS 887088  1/1962  United Kingdom ............... 403/258

Primary Examiner—Andrew V. Kundrat
Attorney, Agent, or Firm—D. Schron

[57] ABSTRACT

A composite-to-metal joint is described which includes an axial metal rod that is embedded in a composite material component to facilitate the application of an axial preload to the joint and apply a compressive force to the composite material. A conical cavity is provided in the metal component of the joint and the composite material component has a surface designed to mate with the same when the two parts are assembled together. The metal rod is embedded in the composite material and extends through an axial aperture in the metal component. A nut threadably engages the rod to draw the two disparate material parts of the joint together, apply a preloading thereto, and apply the compressive force mentioned above to the composite material.

24 Claims, 2 Drawing Sheets

COMPOSITE-TO-METAL SHAFT JOINT

BACKGROUND OF THE INVENTION

This invention relates to shaft joints between metal and composite material shaft components and, more particularly, to such a shaft joint which is quite effective in transmitting both torsional and axial loads between the metal and composite material components without breaking or cutting the composite fibers. In this connection, the composite material used for a shaft or a component of such a shaft typically includes layers of wound fibers, such as ones of fiberglass, and a relatively high modulus material, such as graphite.

While most shafts for transmitting rotational power typically are made of metal, it often is desirable that such a shaft be made from a composite material to reduce weight and transmitted noise. For example, the final drive shaft of a typical submarine designed to transmit torque to the propeller is often both quite large in diameter, e.g, more than 18 inches, long, e.g, it may be more than 25 feet long. It will be appreciated that if such a giant shaft was made entirely of metal, it would be quite heavy, as well as act as a good transmitter of noise to the outside of the submarine.

While it is common to make the majority of the length of a shaft of a composite material, it is also common to use a selected metal at certain locations which may be subjected to stresses which can be accommodated better by the metal. For example, it is common that propeller shafts be made of a high strength metal at the junction between the shaft and the propeller. Thus composite-to-metal shaft joints must be used. It will be recognized that such a joint must transmit both the axial, bending and torsional loads expected to be encountered.

Those joints that have been designed and used in the past have suffered from various deficiencies. For example, in most existing joints, the attachment (load transmission from composite-to-metal) is accomplished by drilling holes through the composite and installing shear pins. This reduces the strength of the composite in the areas of the drill holes by a factor of two or more. Another approach that has been considered is to glue or epoxy the joint between the composite and metal. This type of joint has its strength limited by the shear strength of the bonding agent. Moreover, it is not uncommon for joints designed in the past to have a diameter that is greater than the diameter of the majority of the shaft in view of the disparate abilities of the composite and metal materials to accommodate the stresses that are to be handled. This can interfere with other structures, cause mass problems, etc. Also, the constraints imposed by the different characteristics of the materials deleteriously interferes with the design choices. The result is that the final design often is less than ideal from some standpoints. For example, most of such joints are more complicated to assemble than desired. It is also difficult to provide such a joint which will transmit all of the expected loads and yet remain dimensionally acceptable.

SUMMARY OF THE INVENTION

The present invention is a composite-to-metal joint that is not subject to the above problems and yet is particularly effective in transmitting loads between the disparate materials of such a joint. It does so without breaking or cutting the fibers of the composite material —it accommodates a wide range of potential axial loads that can be accommodated, has a diameter that is the same as the shaft of which it is a part, and is easy to assemble. The invention also includes a method of assembling such a joint.

In broad terms, the joint includes means defining composite material and metal shaft components configured to have both a torsional interference fit and an axial load transmission fit and, as part of the joint itself, means position for cooperation with the metal shaft component to capture and sandwich the composite material shaft component therebetween. Such means most desirably also applies a radially uniform compressive force to the composite material at the joint. Means are also preferably provided for applying a preload to the joint for load transmission.

Most simply, the capturing means is an elongated metal rod which is embedded within the composite material shaft component axially of the same. The preloading means then simply is a nut threadably engaged with the rod, bearing against the metal component to wedge the end of the composite material within a female cavity of the metal shaft component.

The preloading means also most desirably is for moving the components relative to one another between a joint assembling position and a position providing the fits. The metal shaft component has a female cavity or, in other words, receptacle, that receives a corresponding male end of the composite material. The joint also most desirably includes an elongated rod that is embedded axially within the composite material, and the rod and the metal component cooperate to capture and sandwich the composite material therebetween.

The method of the invention includes capturing the composite component within the metal component as part of the assembly operation. This is most desirably accomplished by drawing a male end of a composite material shaft component into a cavity of a metal shaft component, the interior surface of which is configured relative to the exterior surface of the composite material end to mate with the same and transmit torsion loads between such components. The drawing can be continued as long as necessary to provide a desired preload to the joint.

Other features and advantages of the invention will be described or will become apparent from the following more detailed description.

BRIEF DESCRIPTION OF THE DRAWINGS

With reference to the accompanying two sheets of drawing.

DETAILED DESCRIPTION OF A PREFERRED EMBODIMENT

Figure 3:
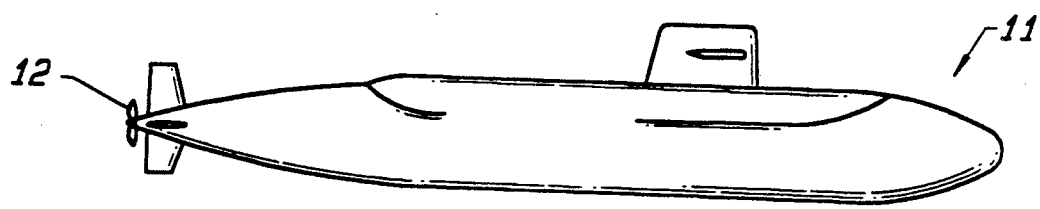
FIG. 3 is a side view of a submarine incorporating the preferred embodiment of the invention.
Figure 4:
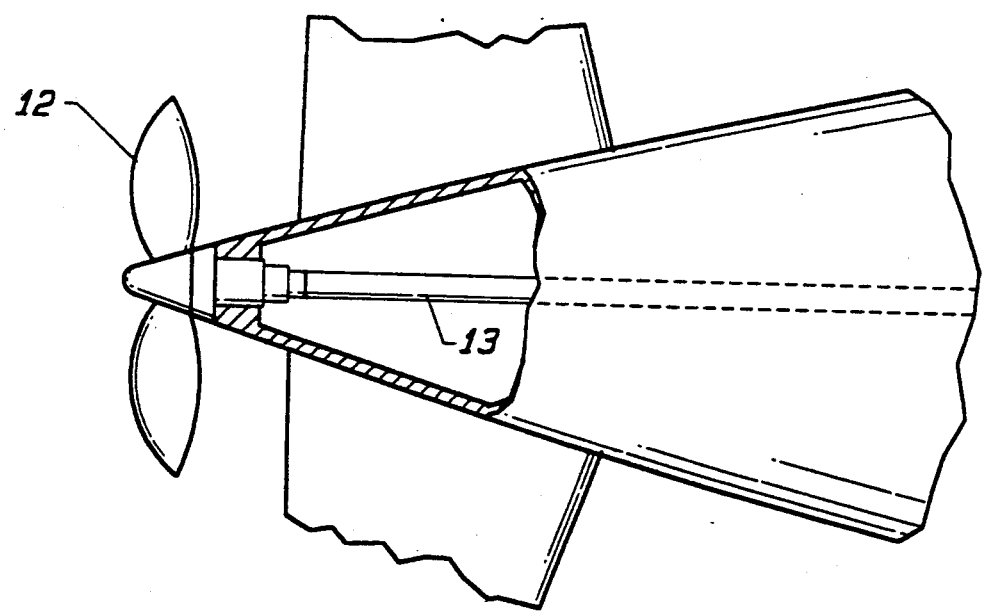
FIG. 4 is an enlarged view of a portion of the submarine of FIG. 3, broken away to illustrate the preferred embodiment of the invention but with immaterial submarine details and parts deleted.

FIGS. 3 and 4 are included primarily to place the invention and the problems addressed by the same in perspective. A submarine, generally referred to be the reference numeral 11, typically includes a propeller 12 as illustrated to propel the same. A shaft 13 extends from appropriate gearing, via bearings and seals, to rotate the propeller. Rotational force is, in turn, supplied to the gearing by a prime mover, such as by one or more steam turbines. (Although use of the preferred embodiment in a submarine is illustrated and being described to emphasize the features of the invention, it will be appreciated that other uses are contemplated and can take advantage of the same.) The length and diameter of shaft 13 will depend, of course, on many factors including the size of the submarine, the thrust desired, etc. It is not unusual for it to have a diameter of greater than 1½ feet and a length of more than 5 feet. Moreover, it may be expected to transmit up to $20 \times 10^6$ inch-pounds of torque and resist axial compressive and tensile loads of about 50,000 pounds.

As mentioned previously, it is desirable to be able to make the major part of a submarine shaft from a composite material but use a metal at certain locations, such as where metal components like the propeller are attached to the same. Thus, composite-to-metal shaft joints are required. The disparate abilities of composite materials and the metals typically used to transmit torsional, bending and axial (compressive and tensile) loads has resulted in many different joint designs. Most, though, represent a compromise between the features desired and the practical considerations forced on designers be such disparate abilities.

Figure 1:
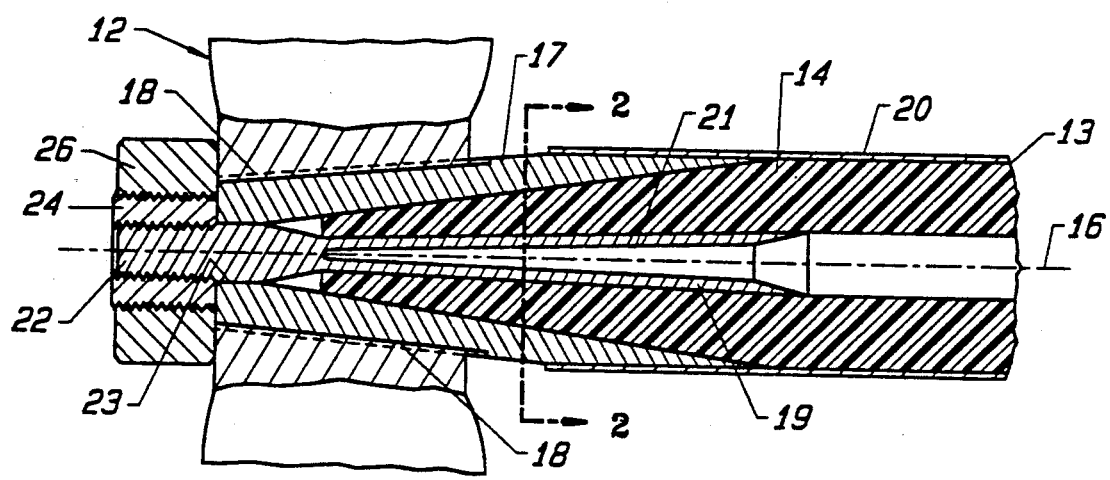
FIG. 1 is an axial somewhat schematic sectional view of a preferred embodiment of the invention.
Figure 2:
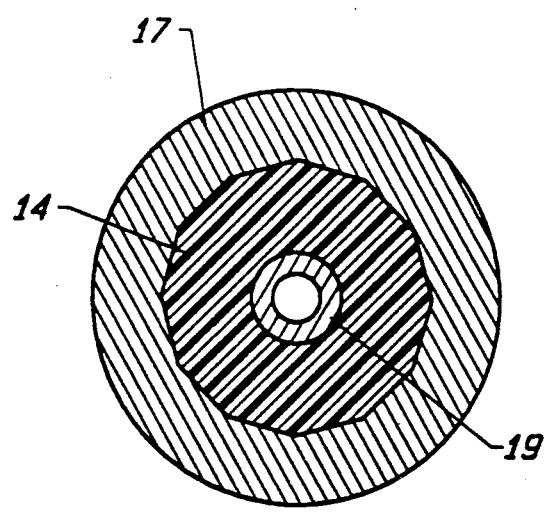
FIG. 2 is a transverse sectional view of the embodiment illustrated in FIG. 1, taken on the lines indicated by the lines 2—2 in FIG. 1.

The present invention relates to a composite-to-metal joint which represents a real advance in the technology. Reference is made to FIGS. 1 & 2 for a detailed showing and discussion of preferred embodiments of the invention. An end 14 of a composite material drive shaft for the propeller 12, which shaft has an axial center line represented at 16, is illustrated joined with a metal shaft component 17. Component 17 acts as the interface with the metal propeller 12. In this connection, it includes a plurality of conventional keys and keyways about its circumference (two keyways 18 of which are illustrated) to transmit rotational force from the shaft to the propeller. A standard bearing sleeve 20 of, for example, titanium, is provided to enable rotation of the shaft within supporting structure.

The metal shaft component has a conical female receptacle or, in other words, a cavity at the end facing the main part of the shaft, that receives the end 14 of the composite material shaft. The composite material end therefore can be considered a male end. Its exterior surface also is conical and is designed to mate tightly with the interior surface of the metal cavity. In connection with the latter, it has the same conical angle relative to the axis 16 as such interior surface.

The mating surfaces are configured to transmit torsional loads between the composite material and the metal components. That is, with reference of FIG. 2, it will be seen that each of these two surfaces are 12-sided polygons in transverse section, and when the two components are assembled together they mate with a torsional interference fit as illustrated. It will be recognized by those skilled in the art that the number of sides of the polygon can vary from three to infinity. Moreover, other conventional approaches to transmitting torsional loads between composite material and metal shaft components can be incorporated into the invention without departing from its basic configuration. It will also be recognized that the fitting of the male end 14 within the cavity of component 17 will result in the transmission between the components, of compressive axial loads.

The joint of the invention also includes an elongated rod 19 embedded within the composite material shaft component along axis 16. As illustrated in FIG. 1, rod 19 has a main cylindrical part 21 within the end of component 14, which part widens out beyond the composite material component to a threaded end 22 that extends axially of the shaft through an aperture 23 in the metal component 17. The cylindrical part of the rod is hollow as shown for weight saving and to provide it with some flexibility. A nut 24 is provided on the end 22 to bear on the end of the metal component 17. It is externally threaded and a locking nut 26 on the same secures propeller 12 in place axially of the shaft and thereby transmits axial load from such propeller into the shaft.

In keeping with the invention, nut 24 and rod 19 cooperate to wedge the end of the composite material component into the cavity provided by the metal component. In this connection, the rod part 21 is also conical relative to the rod axis. However, as illustrated the angle relative to the shaft axis by which its conical exterior surface is formed, is considerably smaller than the conical angle of the aforementioned mating surfaces.

The wedging action and the other features of the design provides several functions. For one, it brings the full aforementioned surfaces together in mating relationship. This spreads over a relatively large surface area, all loads which are to be transmitted between the components. Moreover, it results in the composite material being captured and sandwiched between the metal rod and the metal shaft component. A desired preload is also applied to the joint, merely by tightening the nut to the required extent. The nut 24 and the rod 19 extend along the axis of the shaft and this action will provide an axial preload. It will be seen that this preloading will enable the joint to withstand a greater tensile load than it would otherwise be able to withstand, since the preloading would have to be overcome by a tensile stress before additional strain would develop in the joint. The design readily enables various preloading stresses to be selected and used.

Another major advantage of the construction is that compressive force is automatically applied to the composite material at the joint. The wedging of the same axially into the metal conical component results in such compressive force. It will be appreciated that this aids in preventing strain on the joint from breaking the fibers of the composite material. It also aids in resisting movement (creep) between fibers and layers in the composite material.

It will be seen that the design of the invention simplifies assembling of the joint. The conical end of the composite material component merely has to be placed in the metal component cavity with the rod 19 extending through aperture 23. The nut 24 then can be placed on the end and rotated to draw or, more generically move, the conical exterior surface of the composite material component into engagement with the interior surface of the metal component cavity. Thus, the mating surfaces are forced together. The desired torsional and axial load transmission fits, as well as the advantages discussed above, are obtained. It will be apparent that the rod 19 and nut 24 together also can be considered to be means for moving the shaft components relative to one another between the joint assembling position and the position providing the surface fits.

Most desirably, the rod 19 is formed with the composite material by using the rod as a mandrel for the formation of the end component and winding the fibers of the material around the same. This results in the desired embedding. The mandrel used for the remainder of the shaft can be removed from the opposite end of the shaft to leave the rod embedded as desired. Alternatively, the rod 19 can be made from several pieces in accordance with conventional practice so that it can be inserted after the rest of the composite material component is formed.

It will be appreciated from the above that the design of the joint of the invention provides many features. In one embodiment a finite element structural analysis indicated it can transmit a torsional load of 20,000,000 inch-pounds and an axial load of 500,000 pounds with a factor of safety in excess of 2.0. Those skilled in the art, though, should keep in mind that the design readily lends itself to scaling to accommodate loads of almost any magnitude.

While the invention has been described in connection with a preferred embodiment, it will be recognized by those skilled in the art that many variations and modifications are possible. For example, while for convenience it has been described in connection with possible use of the same as an interface with a submarine propeller, it is equally useful for other arrangements, such as an interface between a composite material shaft and gearing. It is therefore intended that the protection afforded applicant be defined by the claims and their equivalents.

What is claimed is:

1. A composite-to-metal shaft joint comprising:
   (a) means defining a metal shaft component having a female cavity, said female cavity having a tapered interior surface;
   (b) means defining a composite material shaft component having a male end positioned for insertion into said female cavity of said metal shaft component, said composite material shaft component configured to have both a torsional interference fit and an axial load transmission fit with said metal shaft component when assembled with the same to form a shaft joint; and
   (c) means positioned for cooperation with said means defining a metal shaft component to capture and sandwich said composite material shaft component therebetween.

2. The composite-to-metal shaft joint of claim 1 wherein said joint is for an elongated shaft having an axis extending in the direction of elongation, and said capturing means also applies a radially uniform compressive force to said composite material shaft component transverse to said shaft axis.

3. The composite-to-metal shaft joint of claim 1 wherein said composite material includes wound fibers and said capturing means includes an elongated rod upon which said fibers are wound.

4. The composite-to-metal shaft joint of claim 3 wherein said rod is of metal.

5. The composite-to-metal shaft joint of claim 1 wherein said capturing means also is for moving said metal shaft component means and said composite material shaft means relative to one another between a joint assembling position and a position providing said fits.

6. The composite-to-metal shaft joint of claim 1 further including means for applying a preload for load transmission to said joint.

7. The composite-to-metal shaft joint of claim 6 wherein said preload is axial relative to said shaft components.

8. The composite-to-metal shaft joint of claim 6 wherein one of said means defining said metal shaft and said composite material shaft components includes a conical female cavity for receiving a male end of the other of said components, and the wedging of said end in said female cavity provides said fits.

9. The composite-to-metal shaft joint of claim 6 wherein said capturing means includes an elongated rod extending axially of said components.

10. The composite-to-metal shaft joint of claim 9 wherein said means defining a metal shaft component has a female cavity having a conical interior surface, which cavity is positioned to receive a male end of said composite material shaft component, and said elongated rod is embedded axially within said male end.

11. The composite-to-metal shaft joint of claim 10 wherein the exterior surface of said male end of said composite material is conically shaped and configured to mate with the interior surface of said female cavity when said end is received therewithin.

12. The composite-to-metal shaft joint of claim 11 wherein the exterior surface of said rod embedded in said male end is also conical, but at an angle which is materially smaller that the angle of the conical shape of the exterior of said end.

13. A composite-to-metal shaft joint for an elongated shaft having an axis extending in the direction of elongation, comprising:
   (a) means defining a metal shaft component having a female cavity, said female cavity having a tapered interior surface;
   (b) means defining a composite material shaft component having a male end positioned for insertion into said female cavity of said metal shaft component, said composite material shaft component configured to have both a torsional interference fit and an axial load transmission fit with said metal shaft component when assembled with the same to form a shaft joint; and
   (c) means for applying a radially uniform compressive force to said composite material shaft component transverse to said shaft axis.

14. The composite-to-metal shaft joint of claim 13 wherein said means defining a metal shaft component has a female cavity having a conical interior surface, which cavity is positioned to receive a male end of said composite material shaft component having an exterior conical surface configured to mate with said cavity surface, which surface configurations cooperate with one another upon the application of said radially uniform compressive force.

15. A composite-to-metal shaft joint comprising:
   (a) means defining a metal shaft component having a female cavity, said female cavity having a tapered interior surface;
   (b) means defining a composite material shaft component having a male end positioned for insertion into said female cavity of said metal shaft component, said composite material shaft component configured to have both a torsional interference fit and an axial load transmission fit with said metal shaft component when assembled with the same to form a shaft joint; and
   (c) means for moving said metal shaft component means and said composite material shaft means relative to one another between a joint assembling position and a position providing said fits.

16. The composite-to-metal shaft joint of claim 15 wherein said configuration providing said axial load transmission fit provides transmission between said components of axial compressive loads.

17. The composite-to-metal shaft joint of claim 15 wherein said moving means also is for cooperation with said means defining a metal shaft component to capture and sandwich said composite material shaft component therebetween.

18. A composite-to-metal shaft joint comprising:
    (a) means defining a metal shaft component having a female conical cavity;
    (b) means defining a composite material shaft component having an end wedged within said cavity and configured to have both a torsional interference fit and an axial load transmission fit therewithin; and
    (c) an elongated preloading rod embedded axially within said composite material shaft means at said end, which rod is positioned for cooperation with said means defining a metal shaft component to capture and sandwich said composite material shaft component therebetween.

19. The composite-to-metal shaft joint of claim 18 wherein the exterior surface of said end is configured to mate with the interior surface of said cavity.

20. The composite-to-metal shaft joint of claim 19 further including means for urging said rod within said cavity axially to apply a axial preload to said joint.

21. A method of assembling a composite-to-metal joint comprising the steps of:
    (a) providing both a metal shaft component having a female cavity and a composite material shaft component having a male end, said cavity and said end respectively having a tapered interior surface and a tapered exterior surface configured to mate and transmit torsion between said components;
    (b) placing said end within said cavity with said surfaces mating to form a joint between said components; and
    (c) forcing said surfaces together.

22. The method of assembling a composite-to-metal joint according to claim 21 further including the step of preloading said joint against axial loads which might be applied thereto.

23. The method of assembling a composite-to-metal joint according to claim 21 wherein said step of forcing includes drawing said surfaces together into a desired torsional interference fit.

24. The method of assembling a composite-to-metal joint according to claim 21 wherein said step of preloading includes drawing said surfaces together into a desired axial load transmission fit.

* * * * *